United States Patent [19]
Janecke et al.

[11] Patent Number: 6,123,644
[45] Date of Patent: Sep. 26, 2000

[54] ADAPTIVE ANTI-HUNT LOGIC FOR AUTOMATED TRANSMISSION DOWNSHIFT CONTROL

[75] Inventors: Daniel P. Janecke, Kalamazoo; Mark D. Boardman, Portage, both of Mich.

[73] Assignee: Eaton Corporation, Cleveland, Ohio

[21] Appl. No.: 09/356,567

[22] Filed: Jul. 19, 1999

[51] Int. Cl.$^7$ .................................................. F16H 61/10
[52] U.S. Cl. ...................................... 477/120; 477/129
[58] Field of Search ................................ 477/120, 129

[56] References Cited

U.S. PATENT DOCUMENTS

| | | | |
|---|---|---|---|
| 4,361,060 | 11/1982 | Smyth | 74/866 |
| 4,595,986 | 6/1986 | Daubenspeck et al. | 364/424.1 |
| 4,648,290 | 3/1987 | Dunkley et al. | 477/78 |
| 4,698,763 | 10/1987 | Smyth | 364/424.1 |
| 4,850,236 | 7/1989 | Braun | 74/337 |
| 4,947,331 | 8/1990 | Speranza | 364/424.1 |
| 5,172,609 | 12/1992 | Nitz et al. | 74/866 |
| 5,219,391 | 6/1993 | Edelen et al. | 74/335 |
| 5,272,939 | 12/1993 | Markyvech | 74/866 |
| 5,335,566 | 8/1994 | Genise | 74/335 |
| 5,389,053 | 2/1995 | Steeby et al. | 477/123 |
| 5,390,561 | 2/1995 | Stine | 74/331 |
| 5,435,212 | 7/1995 | Menig | 74/745 |
| 5,436,834 | 7/1995 | Graf et al. | 477/129 |
| 5,479,345 | 12/1995 | Amsallen | 364/424.1 |
| 5,487,004 | 1/1996 | Amsallen | 364/424.1 |
| 5,489,247 | 2/1996 | Markyvech | 477/120 |
| 5,490,063 | 2/1996 | Genise | 364/424.1 |
| 5,509,867 | 4/1996 | Genise | 477/120 |
| 5,533,946 | 7/1996 | Markyvech | 477/78 |
| 5,568,748 | 10/1996 | Carlson et al. | 477/120 |
| 5,582,069 | 12/1996 | Genise | 74/335 |
| 5,582,558 | 12/1996 | Palmeri et al. | 477/109 |
| 5,620,392 | 4/1997 | Genise | 477/120 |
| 5,655,407 | 8/1997 | Dresden et al. | 74/336 |
| 5,672,139 | 9/1997 | Horiguchi | 477/120 |
| 5,713,445 | 2/1998 | Davis et al. | 192/35 |
| 5,737,978 | 4/1998 | Stine | 74/606 |
| 5,743,143 | 4/1998 | Carpenter et al. | 74/335 |
| 5,766,111 | 6/1998 | Steeby et al. | 477/124 |

*Primary Examiner*—Dirk Wright
*Attorney, Agent, or Firm*—Howard D. Gordon

[57] ABSTRACT

A method/system for controlling downshifting in an automated mechanical transmission system (10) utilized on a vehicle. The anti-hunt logic after an upshift will sense conditions of high throttle demand (THL>85%) and low vehicle acceleration (d/dt(OS)<0) and reduce at least a portion (72) of the direction of last shift anti-hunt offset to the downshift profiles.

30 Claims, 4 Drawing Sheets

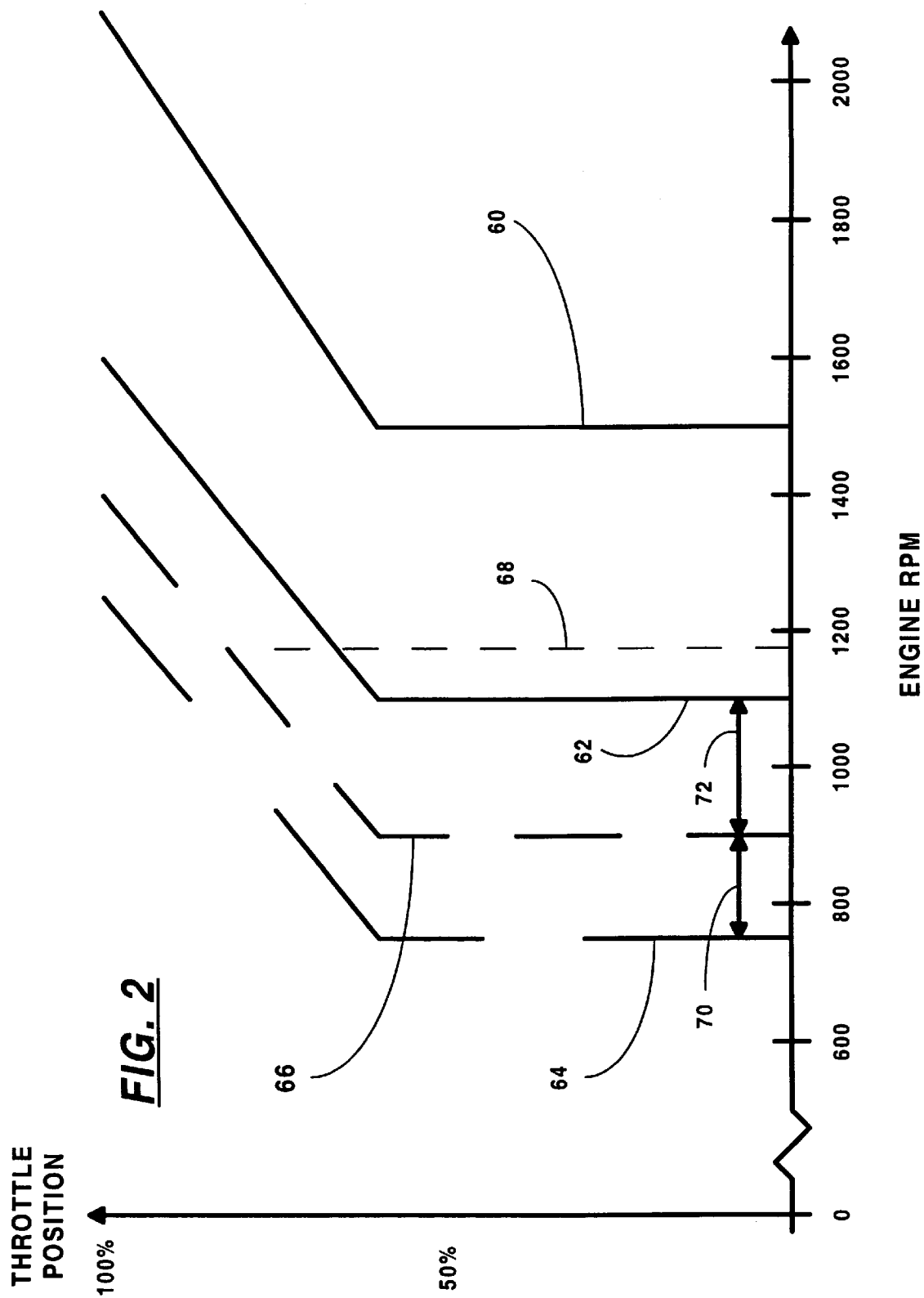

ADAPTIVE ANTI-HUNT LOGIC FOR AUTOMATED TRANSMISSION DOWNSHIFT CONTROL

BACKGROUND OF THE INVENTION

1. Field of the Invention

The present invention relates to a control method/system for controlling downshifting in an at least partially automated mechanical transmission system. In particular, the present invention relates to the control of downshifting in a vehicular automated mechanical transmission system wherein the system, to prevent "hunting," after an upshift, decreases the engine speed at which a downshift will be requested until the passage of a period of time and/or the occurrence of a predetermined event, such as engine speed exceeding a predetermined reference value.

More particularly, the present invention relates to control logic which will sense high load operating conditions occurring after an upshift to reset the downshift points to the normal values thereof from the anti-hunt values.

2. Description of the Prior Art

Fully or partially automated mechanical transmission systems for vehicular use are known in the prior art, as may be seen by reference to U.S. Pat. Nos. 4,361,060; 4,648,290; 4,722,248; 4,850,236; 5,389,053; 5,487,004; 5,435,212 and 5,755,639.

Controls for automated mechanical transmission systems, especially wherein shifting is accomplished while maintaining the master clutch engaged, wherein single and/or skip shift feasibility is evaluated are known in the prior art, as may be seen by reference to U.S. Pat. Nos. 4,576,065; 4,916,979; 5,335,566; 5,425,689; 5,272,939; 5,479,345; 5,533,946; 5,582,069; 5,620,392; 5,489,247; 5,490,063 and 5,509,867, the disclosures of which are incorporated herein by reference.

Anti-hunt logic for automatic mechanical transmissions is known in the prior art. See U.S. Pat. Nos. 4,361,060 and 4,698,763, the disclosures of which are incorporated herein by reference.

As may be seen by reference to aforementioned U.S. Pat. Nos. 4,361,060 and 4,698,763, to avoid undesirably rapid downshifts after an upshift, or undesirably rapid upshifts after a downshift (i.e., "hunting"), it is known to adjust or modify the shift points or shift profiles after a shift by increasing the upshift engine speed after a downshift and/or decreasing the downshift engine speed after an upshift. It is also known that the shift points or profiles should be reset to their normal positions to achieve desired vehicle operation as quickly as possible after the likelihood of hunting has been minimized. Typically, the shift profiles are reset in two increments, one related to the passage of time and the other to engine speed "passing through" a reset engine speed (i.e., going from greater than to less than, or going from less than to greater than, the reset engine speed).

While the above-referenced automatic transmission control systems are very effective to control an automatic transmission by selecting a desired gear ratio which will tend to optimize the fuel economy and/or performance of the vehicle in view of the sensed parameters and then to command a shift into the selected gear ratio, such control systems were not totally satisfactory. In particular, such control systems were not totally satisfactory, as the portion of reset of the downshift shift profiles to the normal positions thereof from a last shift upshift offset related to engine speed was not highly responsive to high throttle position ($\geq 90\%$) coupled with a lack of vehicle acceleration ($d/dt(OS) \leq 0$). These are conditions indicative of an upshift occurring just as a vehicle begins to climb an upgrade.

SUMMARY OF THE INVENTION

In accordance with the present invention, the drawbacks of the prior art have been overcome or minimized by providing a control system, preferably an electronic control system, for automatic transmissions, such as automatic mechanical transmissions, wherein gear selection and shift decisions are made and executed based upon measured and/or calculated parameters, including current input shaft or engine speed, throttle position and/or output shaft or vehicle speed, and wherein the predetermined program by which shift commands are generated will modify the shift profiles in accordance with the direction of the last shift and will reset the shift profiles, at least partially, to the normal positions thereof based upon sensed throttle position and vehicle performance subsequent to the last shift.

The foregoing is accomplished by providing a transmission control system including a central processing unit generating shift patterns based upon sensed or calculated engine speed and throttle position and wherein the shift pattern at which upshifts are commanded is modified by raising the engine speed at which upshifts are commanded in response to the processing unit initiating a downshift, and lowering the engine speed at which downshifts are commanded in response to the processing unit initiating an upshift. The shift patterns are at least partially reset to the normal positions thereof when engine speed achieves a predetermined relationship to a reset engine speed value or values.

After an upshift, upon sensing that throttle position is relatively high (THL>85%) and that the vehicle is not accelerating ($d/dt(OS) \leq 0$), the downshift profile is at least partially reset to the normal (i.e., not offset as a function of the direction of the last shift) values thereof.

Accordingly, an improved downshift control for automated mechanical transmissions is provided which will sense uphill vehicle travel occurring immediately after an upshift (i.e., when a downshift is probably desirable) and modify the anti-hunt logic accordingly.

This and other objects and advantages of the present invention will become apparent from a reading of the following description of the preferred embodiment taken in connection with the attached drawings.

BRIEF DESCRIPTION OF THE DRAWINGS

FIG. 2 is a schematic illustration, in graphical format, illustrating shift point profiles for the transmission system of FIG. 1 according to the present invention.

DESCRIPTION OF THE PREFERRED EMBODIMENT

Figure 1:
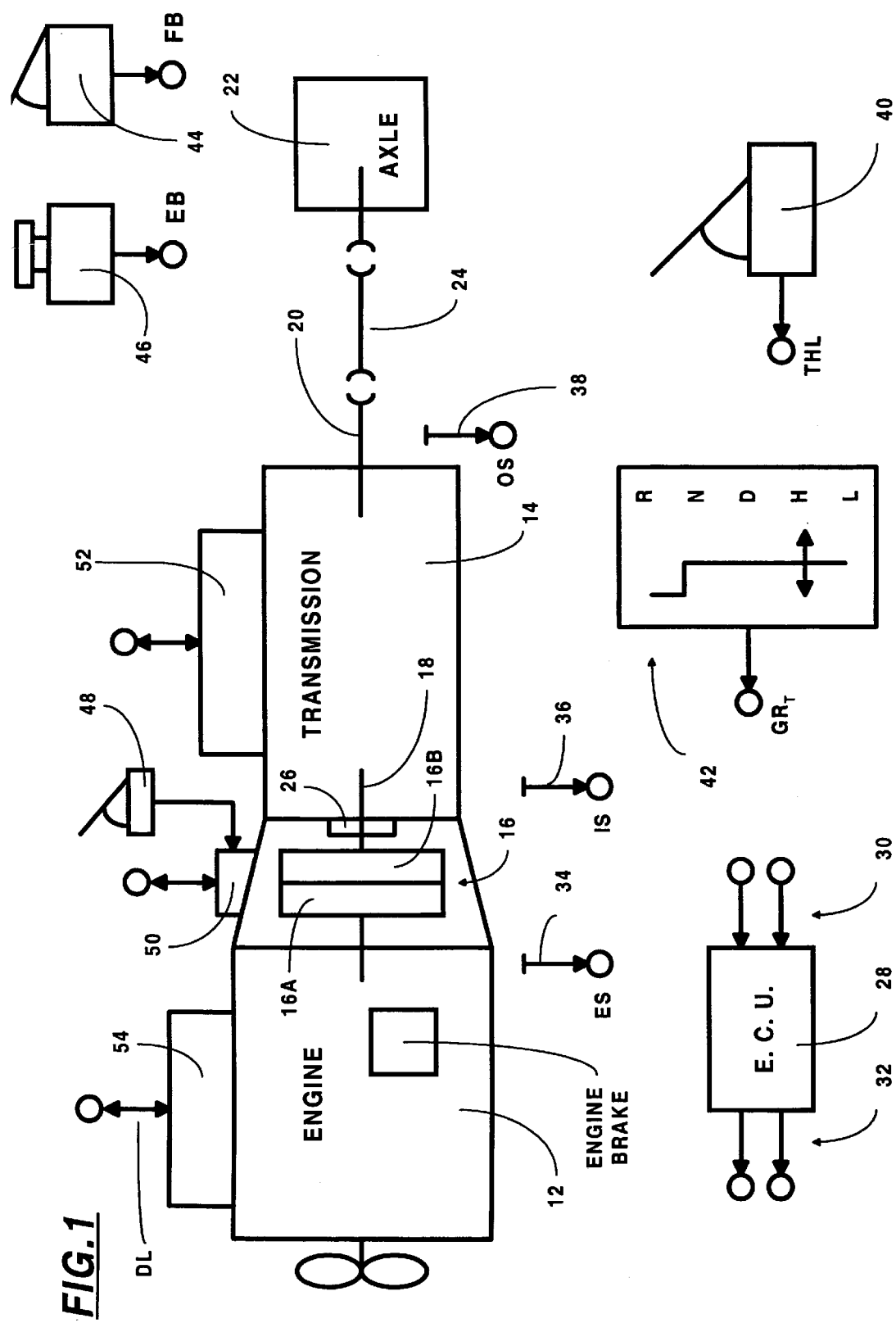
FIG. 1 is a schematic illustration, in block diagram format, of an automated mechanical transmission system utilizing the control of the present invention.

An at least partially automated mechanical transmission system intended for vehicular use is schematically illustrated in FIG. 1. The automated transmission system 10 includes a fuel-controlled engine 12 (such as a well-known diesel engine or the like), a multiple-speed, change-gear transmission 14, and a non-positive coupling 16 (such as a friction master clutch) drivingly interposed between the engine and the input shaft 18 of the transmission. Engine 12 is preferably a heavy-duty vehicle diesel engine having a governed maximum speed of about 2100 to 2200 rpm. The transmission 14 may be of the compound type comprising a main transmission section connected in series with a splitter- and/or range-type auxiliary section. Transmissions of this type, especially as used with heavy-duty vehicles, typically have 6, 7, 9, 10, 12, 13, 16 or 18 forward speeds. Examples of such transmissions may be seen by reference to U.S. Pat. Nos. 5,390,561 and 5,737,978, the disclosures of which are incorporated herein by reference.

A transmission output shaft 20 extends outwardly from the transmission 14 and is drivingly connected with the vehicle drive axles 22, usually by means of a prop shaft 24. The illustrated master friction clutch 16 includes a driving portion 16A connected to the engine crankshaft/flywheel and a driven portion 16B coupled to the transmission input shaft 18 and adapted to frictionally engage the driving portion 16A. An upshift brake 26 (also known as an input shaft brake or inertia brake) may be used for selectively decelerating the rotational speed of the input shaft 18 for more rapid upshifting, as is well known. Input shaft or upshift brakes are known in the prior art, as may be seen by reference to U.S. Pat. Nos. 5,655,407 and 5,713,445.

A microprocessor-based electronic control unit (or ECU) 28 is provided for receiving input signals 30 and for processing same in accordance with predetermined logic rules to issue command output signals 32 to various system actuators and the like. Microprocessor-based controllers of this type are well known, and an example thereof may be seen by reference to U.S. Pat. No. 4,595,986.

System 10 includes a rotational speed sensor 34 for sensing rotational speed of the engine and providing an output signal (ES) indicative thereof, a rotational speed sensor 36 for sensing the rotational speed of the input shaft 16 and providing an output signal (IS) indicative thereof, and a rotational speed sensor 38 for sensing the rotational speed of the output shaft 20 and providing an output signal (OS) indicative thereof. A sensor 40 may be provided for sensing the displacement of the throttle pedal and providing an output signal (THL) indicative thereof. A shift control console 42 may be provided for allowing the operator to select an operating mode of the transmission system and for providing an output signal ($GR_T$) indicative thereof.

As is known, if the clutch is engaged, the rotational speed of the engine may be determined from the speed of the input shaft and/or the speed of the output shaft and the engaged transmission ratio (ES=IS=OS*GR).

System 10 also may include sensors 44 and 46 for sensing operation of the vehicle foot brake (also called service brakes) and engine brakes, respectively, and for providing signals FB and EB, respectively, indicative thereof.

The master clutch 16 may be controlled by a clutch pedal 48 or by a clutch actuator 50 responding to output signals from the ECU 28. Alternatively, an actuator responsive to control output signals may be provided, which may be overridden by operation of the manual clutch pedal. In the preferred embodiment, the clutch is manually controlled and used only to launch the vehicle (see U.S. Pat. Nos. 4,850,236; 5,272,939 and 5,425,689). The transmission 14 may include a transmission actuator 52, which responds to output signals from the ECU 28 and/or which sends input signals to the ECU 28 indicative of the selected position thereof. Shift mechanisms of this type, often of the so-called X-Y shifter type, are known in the prior art, as may be seen by reference to U.S. Pat. Nos. 5,305,240 and 5,219,391. Actuator 52 may shift the main and/or auxiliary section of transmission 14. The engaged or disengaged condition of clutch 16 may be sensed by a sensor or determined by comparing the signals ES and IS indicative to the engine and input shaft rotational speeds.

Fueling of the engine is preferably controlled by an electronic engine controller 54, which accepts command signals from and/or provides input signals to the ECU 28. Preferably, the engine controller 54 will communicate with an industry standard data link DL which conforms to well-known industry protocols such as SAE J1922, SAE 1939 and/or ISO 11898. The ECU 28 may be incorporated within the engine controller 54.

As is known, for automated shifting, the ECU 28 must determine when upshifts and downshifts are required and if a single or skip shift is desirable (see U.S. Pat. Nos. 4,361,060; 4,576,065; 4,698,763; 4,916,979 and 4,947,331).

FIG. 2 is a graphical representation of shift point profiles utilized to determine when shift commands should be issued by the ECU 28 to the shift actuator 52 and/or other system actuators.

One of the primary purposes of the central processing unit program or logic rules is to generate shift patterns, or shift point profiles, as is graphically illustrated in FIG. 2. The shift point profiles generated by the central processing unit will determine if the transmission should remain in the currently engaged gear ratio, should be upshifted to the next highest gear ratio or downshifted to the next lower gear ratio. In certain situations, multiple upshifts or downshifts may be selected. The shift point profiles are determined by a predetermined program acting upon current or stored information and are usually selected to provide a compromise between operation at the most fuel-efficient possible gear ratio and operation in a gear ratio to provide optimal performance characteristics of the vehicle. The shift point profiles graphically illustrated in FIG. 2 as a function of both throttle position, expressed as a percentage of maximum throttling position, and of engine speed. For purposes of making shift decisions, the engine speed may be directly sensed or calculated engine speed, which will not vary during a shift transient, as is known in the prior art.

Both the normal upshift profile 60 and the normal downshift profile 62, also called shift point profiles, shift patterns, etc., provide the basis for shifting the transmission as a function of speed modulated by the driver-controlled throttle position. Throttle position is shown as a percentage of full (i.e., "wide open") throttle from 0% to 100%.

It is understood that other sensed or calculated monitored speeds, such as input shaft speed, output shaft speed, vehicle speed or the like, may be substituted for engine speed in the shift point profiles illustrated in FIG. 2.

Briefly, for operating conditions within the space bounded by downshift line 62 and upshift line 60, no gear change is required. For operating conditions at or to the right of upshift line 60, an upshift to the next highest gear ratio is required, and for operating conditions within the area at or to the left of downshift line 62, a downshift to the next lowest gear ratio is required. It is understood, of course, that a single shift point profile may be utilized for all gear ratios of a transmission or a separate shift profile may be generated for each currently engaged gear ratio. Generally, the greater the difference in ratio splits between the gears, the greater the desirability of separate shift point profiles for each currently engaged gear ratio.

It may be appreciated that the maximizing of fuel economy and vehicle efficiency is often in conflict. The placement of upshift and downshift lines in a shift point profile, thus, is an attempt to achieve an optimal compromise between fuel efficiency and vehicle performance. As the relative importance of fuel efficiency and vehicle performance varies under different operating conditions, as determined by central processing unit 28 acting upon current and/or stored information in accordance with a program, the upshift and downshift lines are preferably not static but are dynamic. Dynamically moving shift lines are known and are discussed in greater detail in U.S. Pat. No. 4,361,060. Typically, the shift lines are moved in response to current and/or stored information, such as direction of last shift, acceleration of the vehicle, acceleration of the engine, rate of change of throttle position, operation of the vehicle brake or the like.

If the shift profiles 60 and 62 were fixed, upshifts would usually lead to an operating point located on or near the downshift lines for the next high gear and vice versa, and hunting between gears would be inevitable. Some additional separation between the upshift and downshift profiles is desirable and acceptable; however, sufficient separation to eliminate hunting can result in an undesirable reduction in fuel economy. To overcome this problem, the control moves the shift profiles as a consequence of a shift. After an upshift, the downshift profile is moved toward lower engine speeds; after a downshift, the upshift profiles are moved toward higher engine speeds. After the tendency for hunting is minimized, the shift profiles should be reset to the normal positions for fuel-efficient operation as quickly as possible.

Referring to FIG. 2, after an upshift, the downshift profile will be moved leftwardly to line 64 and then, after a predetermined time interval (for example, 2 seconds), to line 66. The adjusted downshift profile will be reset from line 66 to line 62, its normal position, upon engine speed achieving a predetermined relationship 68 to a reset value or set of values. This type of shift profile modification in response to the direction of the last shift is described in aforementioned U.S. Pat. Nos. 4,361,060 and 4,698,763.

The shift profile modifications in response to the direction of the last shift may be considered to have a time-related component defined by the difference 70 between lines 64 and 66 at a given throttle position, and a drivetrain condition-related component defined by the difference 72 between lines 66 and 62 at a given throttle position. The present invention relates to cancellation of the drivetrain condition-related component of the direction of last shift shift point profile modification (i.e., to the resetting of the downshift profiles to the normal positions thereof) from the drivetrain condition-related components of the adjusted profiles 66. The present invention does not relate to the time-related components of the shift profile modifications which, for purposes of the present invention, may be considered optional or which could be controlled by the reset procedures which are the subject of this invention.

In the present invention, the downshift profile is reset to the normal position thereof (i.e., to line 62) from the drivetrain condition-related component of the adjusted profile (i.e., from line 66) when the engine speed achieves a predetermined value 68 or values, relative to a reset engine speed reference value or values. The reset engine speed reference value 68 is calculated at the time of the last shift to reflect the last engaged gear ratio, the engine speed at the time of the last shift, and vehicle performance subsequent to the last shift required to minimize the possibility of hunting-type future shifting.

If, after an upshift, throttle position is relatively high (for example, greater than 85%) and the vehicle is not accelerating ($d/dt(OS) \leq 0$), then it is probable that the vehicle has begun to climb an upgrade. Under these conditions, a downshift may be desirable and, under prior logic, would be inhibited, as engine speed will be unable to achieve the reset value 68.

According to the present invention, upon sensing that throttle position is relatively high and that the vehicle is not accelerating, the vehicle performance (i.e., drivetrain condition) offset 72 is reduced to zero. This reduction may occur immediately, in several increments, or preferably, in a continuous ramp down (for example, at about 4 RPM per 40 milliseconds).

For a typical heavy-duty truck having a diesel engine with a rated RPM of 2100, 70 will equal about 100 RPM and 72 will equal about 150 RPM. The time-based anti-hunt offset 70 will typically be canceled 1–3 seconds after an upshift, regardless of vehicle performance.

Figure 3A:
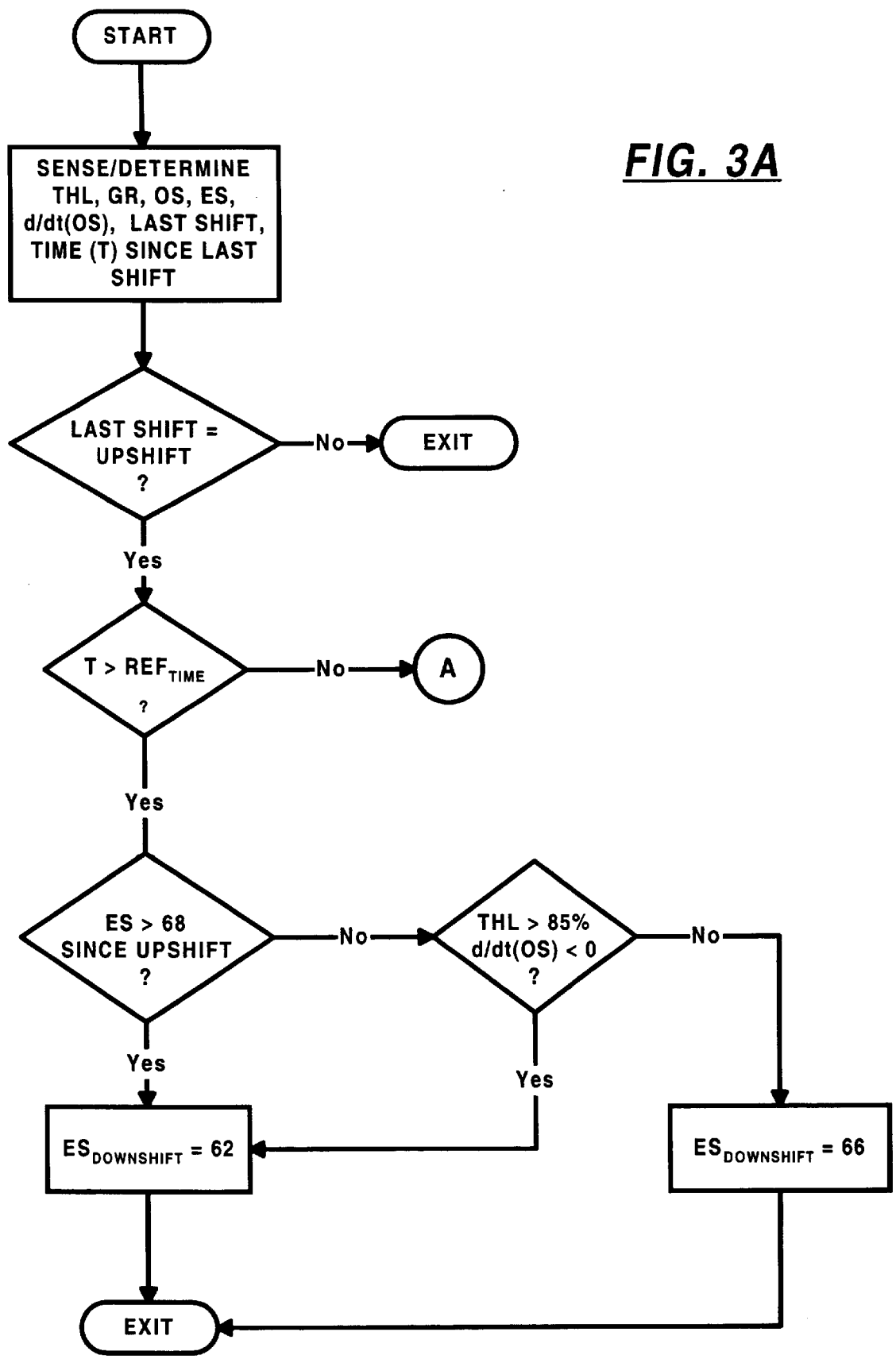
FIGS. 3A and 3B are schematic illustrations, in flow chart format, of the control of the present invention.
Figure 3B:
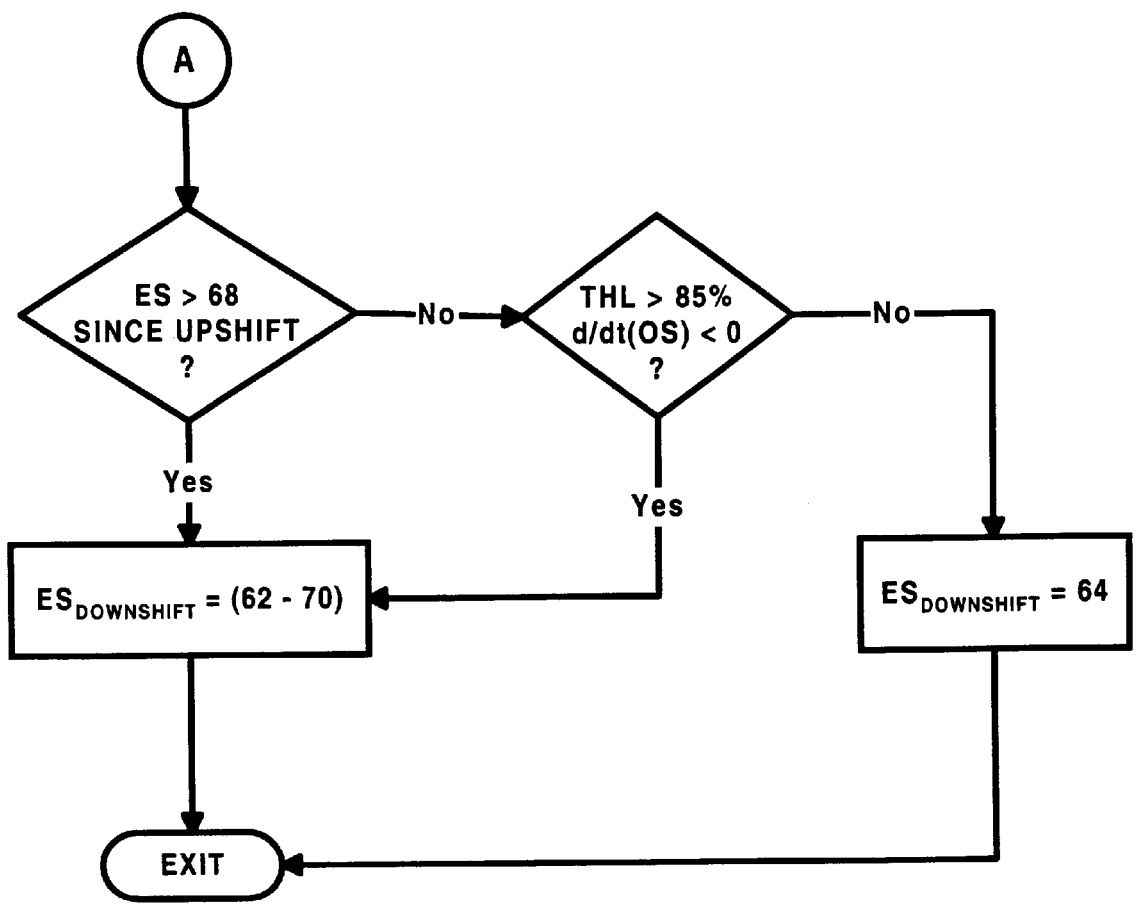

The control of the present invention is shown in flow chart format in FIGS. 3A and 3B.

Accordingly, it may be seen that an improved control system/method for controlling downshifting in an at least partially automated mechanical transmission system in a vehicle is provided.

Although the present invention has been described with a certain degree of particularity, it is understood that the description of the preferred embodiment is by way of example only and that numerous changes to form and detail are possible without departing from the spirit and scope of the invention as hereinafter claimed.

We claim:

1. A method for controlling automatic downshifting in a vehicular automated mechanical transmission system (10) for a vehicle comprising a fuel-controlled engine (12), a multiple-speed mechanical transmission (14), and a controller (28) for receiving input signals (30) including one or more of signals indicative of direction of last shift, engine speed (ES), engaged gear ratio (GR) and vehicle speed (OS), and to process said input signals in accordance with logic rules to issue command output signals (32) to transmission system actuators including a transmission actuator (52) effective to shift said transmission, said control effective to command downshifts if, at current throttle position, the signal indicative of engine speed is less than a downshift reference value ($ES_{DOWNSHIFT}$) for said current throttle position, said control setting a first default value (62) for said reference value and effective after an upshift to cause said reference value to be less than said default value by at least an anti-hunt offset value (72) until engine speed equals a reset reference value (ES=68), said method characterized by:

(a) determining a value indicative of throttle position (THL);

(b) determining a value indicative of vehicle acceleration ($d/dt(OS)$); and (c) if (i) throttle position is greater than a throttle reference value ($THL > REF_{THL}$), and (ii) the vehicle is accelerating at less than a predetermined rate ($d/dt(OS) < 0$), causing the absolute value of said anti-hunt offset value to decrease.

2. The method of claim 1 wherein in step (c), the value of said anti-hunt offset is reduced to a zero value.

3. The method of claim 1 wherein in step (c), the value of said anti-hunt offset is reduced in a continuous manner over a period of time.

4. The method of claim 3 wherein said period of time is about 1–3 seconds.

5. The method of claim 2 wherein in step (c), the value of said anti-hunt offset is reduced in a continuous manner over a period of time.

6. The method of claim 1 wherein in step (c), the value of said anti-hunt offset is reduced in one or more steps.

7. The method of claim 1 wherein said anti-hunt offset (72) is about 100–200 RPM for a diesel engine having a rated speed of about 2100 RPM.

8. The method of claim 2 wherein said anti-hunt offset (72) is about 100–200 RPM for a diesel engine having a rated speed of about 2100 RPM.

9. The method of claim 3 wherein said anti-hunt offset (72) is about 100–200 RPM for a diesel engine having a rated speed of about 2100 RPM.

10. The method of claim 1 wherein said throttle reference value is about 85% of full throttle.

11. The method of claim 2 wherein said throttle reference value is about 85% of full throttle.

12. The method of claim 3 wherein said throttle reference value is about 85% of full throttle.

13. The method of claim 7 wherein said throttle reference value is about 85% of full throttle.

14. The method of claim 1 wherein said predetermined rate of acceleration is about zero.

15. A control system for controlling automatic downshifting in a vehicular automated mechanical transmission system (10) for a vehicle comprising a fuel-controlled engine (12), a multiple-speed mechanical transmission (14), and a controller (28) for receiving input signals (30) including one or more of signals indicative of direction of last shift, engine speed (ES), engaged gear ratio (GR) and vehicle speed (OS), and to process said input signals in accordance with logic rules to issue command output signals (32) to transmission system actuators including a transmission actuator (52) effective to shift said transmission, said control effective to command downshifts if, at current throttle position, the signal indicative of engine speed is less than a downshift reference value ($ES_{DOWNSHIFT}$) for said current throttle position, said control setting a first default value (62) for said reference value and effective after an upshift to cause said reference value to be less than said default value by at least an anti-hunt offset value (72) until engine speed equals a reset reference value (ES=68), said control characterized by logic rules effective for:

(a) determining a value indicative of throttle position (THL);

(b) determining a value indicative of vehicle acceleration (d/dt(OS)); and (c) if (i) throttle position is greater than a throttle reference value (THL>$REF_{THL}$), and (ii) the vehicle is accelerating at less than a predetermined rate (d/dt(OS)<0), causing the absolute value of said anti-hunt offset value to decrease.

16. The system of claim 15 wherein in step (c), the value of said anti-hunt offset is reduced to a zero value.

17. The system of claim 15 wherein in step (c), the value of said anti-hunt offset is reduced in a continuous manner over a period of time.

18. The system of claim 17 wherein said period of time is about 1–3 seconds.

19. The system of claim 16 wherein in step (c), the value of said anti-hunt offset is reduced in a continuous manner over a period of time.

20. The system of claim 15 wherein in step (c), the value of said anti-hunt offset is reduced in one or more steps.

21. The system of claim 15 wherein said anti-hunt offset (72) is about 100–200 RPM for a diesel engine having a rated speed of about 2100 RPM.

22. The system of claim 16 wherein said anti-hunt offset (72) is about 100–200 RPM for a diesel engine having a rated speed of about 2100 RPM.

23. The system of claim 17 wherein said anti-hunt offset (72) is about 100–200 RPM for a diesel engine having a rated speed of about 2100 RPM.

24. The system of claim 15 wherein said throttle reference value is about 85% of full throttle.

25. The system of claim 16 wherein said throttle reference value is about 85% of full throttle.

26. The system of claim 17 wherein said throttle reference value is about 85% of full throttle.

27. The system of claim 22 wherein said throttle reference value is about 85% of full throttle.

28. The system of claim 15 wherein said predetermined rate of acceleration is about zero.

29. The system of claim 16 wherein said predetermined rate of acceleration is about zero.

30. The system of claim 24 wherein said predetermined rate of acceleration is about zero.

* * * * *